June 25, 1968 T. W. SQUIRES 3,390,344
OPERATIONAL AMPLIFIER
Filed Oct. 1, 1964
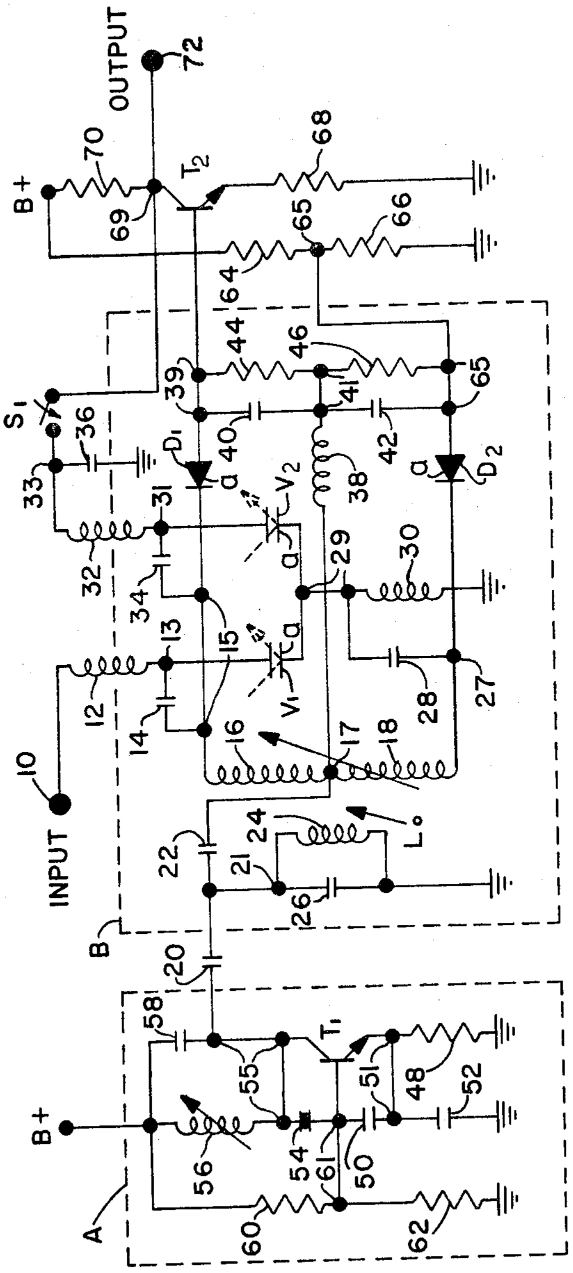
INVENTOR.
THURSTON W. SQUIRES
BY Michael A. Giley Jr.
ATTORNEY United States Patent Office 3,390,344

Patented June 25, 1968

3,390,344

OPERATIONAL AMPLIFIER

Thurston W. Squires, Orange County, Fla., assignor to Martin Marietta Corporation, Middle River, Md., a corporation of Maryland Filed Oct. 1, 1964, Ser. No. 400,811
12 Claims. (Cl. 330—9)

ABSTRACT OF THE DISCLOSURE

An operational amplifier apparatus for performing amplifying, integrating, and differentiating functions, and having a crystal controlled oscillator which supplies a preselected RF frequency to a modified Foster-Seeley type discriminator circuit. The discriminator circuit is tuned to the fixed RF signal by means of a voltage variable capacitance which is in parallel with the discriminator tank circuit. An analog signal is series fed to the voltage variable capacitance and differentially detunes the tank circuit which tank circuit is connected to a rectifying circuit for developing an output signal proportional to the input signal on an output buffer amplifier. When the amplifier is not being used to perform the desired amplifying, integrating, or differentiating functions, a reset switch connects a degenerative feedback circuit between the buffer amplifier and the voltage variable capacitance to compensate for component variations in the operational amplifier.

This invention relates to FM operational amplifiers, and more particularly to a broad band FM operational amplifier in which a uniquely modified Foster-Seely type FM discriminator having voltage variable capacitors is differentially detuned in response to low-level, varying DC input signals, so as to accurately develop a DC output voltage proportional to such DC input signals, yet advantageously provide a high impedance input and a low impedance output. The operational amplifier of the present invention also employs a unique arrangement of a voltage variable capacitor in a unity gain, degenerative feedback circuit for substantially reducing voltage drifts due to component variations, particularly voltage drifts caused by excessive temperature changes.

The ideal operational amplifier is theoretically capable of performing the function $$e_o = -e_{in}\frac{Z_f}{Z_{in}}$$

where:

$e_o$=output voltage,
$e_{in}$=input voltage,
$Z_f$=feedback impedance, and
$Z_{in}$=input impedance.

In practical circuit design the above function can be approximated quite closely if the operational amplifier has extremely high gain (infinity), or it has an extremely high input impedance (infinity) with medium gain. Various types of DC coupled amplifier circuits have been developed to approximate the function of the ideal operational amplifier.

One prior known circuit is the chopper stabilized convertor which operates as a switch for alternatively transferring the modulating signal applied between two input terminals. The signal seen by the amplifier appears sampled at the switching rate of the chopper, thus modulating a fixed frequency carrier, which, after being amplified, can be rectified and filtered. DC coupled amplifier circuits of the chopper stabilized type although acceptable for some circuit applications, are, however, unacceptable for amplifying relatively low-level DC signals because they (1) experience excessive voltage drifts in the output signal when subjected to relatively wide temperature gradients, (2) are limited in their frequency response by the chopper frequency and associated filters, (3) have relatively low input impedance, (4) are vibration and shock sensitive, and (5) require relatively high power sources. The present invention uniquely overcomes the foregoing disadvantages of the prior art, yet it is simple in construction, lightweight and inexpensive.

Another well known DC amplifier utilizes resonant circuits which are differentially coupled so that no carrier output is obtained in the absence of a modulating DC signal input. The tuning of the resonant circuits is controlled by the modulating DC voltage which causes variations in the capacity of voltage variable capacitors associated with the resonant capacitors. Although this type of DC amplifier is capable of providing reasonably acceptable voltage and power gains, it does not provide acceptable temperature stabilities over wide temperature gradients, and does not provide a high impedance input nor a low impedance output.

In accordance with the present invention, a discriminator transformer is tuned by coupling a series connected voltage variable capacitor in parallel to the center tapped secondary of the transformer, thus in effect providing a balanced LC bridge network. The primary of the discriminator transformer is energized by a fixed frequency developed by a crystal controlled oscillator, and is both inductively and capacitively coupled to the transformer secondary. The low-level, varying DC voltages to be amplified are DC coupled to the voltage variable capacitor, thus, detuning the transformer secondary and unbalancing the LC bridge network. A pair of diode rectifiers are then coupled to the transformer secondary for rectifying the fixed frequency and developing a DC output voltage proportional to the applied DC input voltage. The output of the diode rectifier is then conventionally amplified. In addition, the operational amplifier includes a novel unity gain degenerative feedback circuit connected between the output of the operational amplifier and the transformer secondary, which in effect is the input of the operational amplifier. This feedback circuit, which is only operative during RESET periods, effectively retunes the transformer secondary and rebalances the LC bridge network so as to compensate for any detuning or unbalancing caused by component variations, particularly voltage drifts caused by excessive temperature changes. Basically, the feedback circuit includes a unique circuit arrangement of a voltage variable capacitor and a memory condenser. The voltage variable capacitor is utilized to degeneratively feed back a voltage so as to retune the transformer secondary in proportion to the detuning caused by component variations which occur during the RESET periods. The memory condenser is used to store the level of the feedback voltage. Accordingly, when the operational amplifier is switched into its OPERATE mode, the memory capacitor couples a voltage to the transformer secondary and maintains the tuning of the circuit so as to provide a compensation factor into the circuit with respect to voltage drifts due to component variations occurring during the RESET mode.

It is therefore a primary object of the present invention to provide an FM operational amplifier which is capable of accurately amplifying low-level, varying DC voltages.

It is another object of the present invention to provide an FM operational amplifier which utilizes a unique arrangement of voltage variable capacitors for detuning a resonant circuit and for developing a DC voltage proportion to the voltage variations of a low-level, DC input voltage to be amplified.

It is another object of the present invention to provide an FM operational amplifier of the type described which closely approximates an ideal operational amplifier in that it provides a relatively high input impedance and a relatively low output impedance.

It is another object of the present invention to provide an FM operational amplifier of the type described which utilizes a unique circuit arrangement of a voltage variable capacitor in a unity gain, degenerative feedback circuit for substantially reducing voltage drifts due to component variations, particularly voltage drifts caused by excessive temperature changes.

It is another object of the present invention to provide an FM operational amplifier of the type described which is simple in construction, economical to manufacture, and highly reliable in performing the intended functions and achieving the desired objects.

These and further objects and advantages of the present invention will become more apparent upon reference to the following description and claims and the appended drawing wherein FIGURE 1 is a detailed circuit of a preferred embodiment of the present invention.

Referring now to FIGURE 1, the operational amplifier comprises a crystal controlled transistorized oscillator A, which includes transistor $T_1$, a unique discriminator-convertor B, and a transistorized output circuit, which includes transistor $T_2$. Oscillator A is utilized to supply a predetermined high frequency, such as in the RF range, to the discriminator convertor B, while the output circuit amplifies and couples to output terminal 72, the DC signals developed by the discriminator-convertor B. The low-level DC input signals to be amplified by the present invention are coupled to the discriminator-convertor B via input terminal 10 and RF choke coil 12.

The discriminator portion of the discriminator-convertor B comprises; an RF choke coil 12 coupled between terminals 10 and 13; a voltage variable capacitor $V_1$, hereafter called a varicap, which is coupled between terminals 13 and 29; a DC blocking capacitor 14 which is coupled between terminals 13 and 15; a discriminator transformer $L_0$ having a secondary winding 16 coupled between terminals 15 and 17, and a secondary winding 18 coupled between terminals 17 and 27; a DC blocking capacitor 28 which is coupled between terminals 27 and 29; an RF choke coil 30 coupled between terminal 29 and ground; and a balancing coil 38 which is coupled between terminals 17 and 41. It will be apparent here that the secondary 16–18 of transformer $L_0$ is LC tuned to a predetermined frequency. The primary of transformer $L_0$ is also LC tuned by coil 24 and capacitor 26, which are connected in parallel between terminal 21 and ground. The primary and secondary of transformer $L_0$ are capacitively coupled by AC coupling capacitor 22, which is connected between terminals 17 and 21. Note here that the transformer $L_0$ is LC tuned to the frequency generated by the oscillator A.

The convertor portion of the discriminator-convertor B comprises: Diode $D_1$ which is coupled between terminals 15 and 39; diode $D_2$ which is coupled between terminals 27 and 65; an RC circuit comprising capacitor 40 and resistor 44, which are coupled in parallel between terminals 39 and 41; and an RC circuit comprising capacitor 42 and resistor 46 which are coupled in parallel between terminals 41 and 65.

The oscillator A is a conventional crystal controlled oscillator which supplies a preselected RF frequency to discriminator-convertor B via coupling capacitor 20. Oscillator A includes transistor $T_1$, whose operating point and stability is determined (1) by resistors 60 and 62, which form a bias divider network between B+ and ground and establish the Q point of $T_1$, (2) by resistor 48, which provides the DC stabilization of transistor $T_1$, and (3) by capacitor 52 which is the RF bypass for the emitter of transistor $T_1$. The coil 56 and capacitor 58, which are connected in parallel between B+ and terminal 55, form the tank circuit of the oscillator A. Coil 56 is preferably variable as shown. The crystal 54 which is coupled between terminals 55 and 61, and the capacitor 50, which is coupled between terminals 51 and 61, form a divider for the base of transistors $T_1$, and provide the regenerative frequency feedback between the collector and the base of transistor $T_1$, so as to sustain oscillation of the tank circuit 56–58.

The output circuit includes transistor $T_2$ which has its collector connected to B+ via terminal 69 and resistor 70, its emitter connected to ground via resistor 68, and its base bias established by a resistive voltage divider, i.e., resistors 64 and 66. Resistors 64 and 66 are series connected between B+ and ground, and the base of transistor $T_2$ is connected to junction terminal 65 via terminal 39, resistor 44, terminal 41 and resistor 46. As mentioned above, the output of the circuit of FIGURE 1 appears at terminal 72.

A feedback circuit is also provided between the output terminal 72 and the terminal 33 of the discriminator portion of discriminator-convertor B. This feedback circuit includes: Single pole, single throw switch $S_1$, which is connected between terminals 33 and 69; a memory capacitor 36, which is connected between terminal 33 and ground; an RF choke coil 32, which is connected between terminals 31 and 33; a DC blocking capacitor 34, which is connected between terminals 15 and 31; and a varicap $V_2$ connected between terminals 29 and 31. This feedback circuit uniquely compensates for voltage drifts during reset periods which are caused by component variations due to excessive temperature changes. A detailed explanation of this advantageous feature will be set forth later.

It should be noted here that the anodes of varicaps $V_1$ and $V_2$ are connected to terminals 29, whereas the cathodes of diodes $D_1$ and $D_2$ are respectively connected to terminals 15 and 27. Accordingly, the varicap and diodes are graphically represented in a conventional manner.

To achieve optimum performance and to calibrate the FM operational amplifier of the present invention, the following procedure should be followed. The supply voltage (B+) will be determined by the required output voltage swing and the circuit component limitations. One half of the supply voltage B+ is the reference voltage, and is applied to point 10 for calibrating the circuit. With switch $S_1$ closed, and with a sensitive voltmeter connected between terminals 10 and 72, the secondary of the discriminator transformer $L_0$ is adjusted for a zero reading on the voltmeter. The circuit is thus calibrated and the mid-voltage of the B+ must be applied to terminal 10 throughout circuit operation for this is the reference voltage. In most applications this reference voltage is selected as zero volts, although such is not the case in the FIGURE 1 circuit. The operation of the amplifier of FIGURE 1 is as follows:

With no signal input applied to terminal 10 and with switch $S_1$ closed the circuit is in the RESET state. In this state, the switch $S_1$ connects the output of the amplifier, which is present at terminal 69, back to the discriminator-convertor B, i.e., terminal 31. Let it be first assumed that oscillator A is generating a desired RF frequency and coupling this frequency via capacitor 20 and 22 and transformer $L_0$ to the discriminator-convertor B, and that this oscillator is temperature stabilized through a wide range of temperatures, such as $-55°$ C. to $+85°$ C. Let it next be assumed that the discriminator has been tuned to the frequency of oscillator A and calibrated as outlined previously. Under these circumstances, the DC voltages passing through diodes $D_1$ and $D_2$ will be equal since the LC bridge between terminals 15 and 27 is balanced. Thus, the DC current through resistors 44 and 46 will be equal and opposite and will have no effect upon the current conducting state of output transistor $T_2$. To say it otherwise, the transistor $T_2$ will experience no current conducting change so long as the LC bridge is balanced, i.e., no DC signals applied at terminal 10 or the LC tank of discriminator-convertor B is tuned to the frequency generated by the oscillator A. There are two conditions which will detune the LC tank and accordingly unbalance the LC bridge. The first is the application of DC signals to terminal 10, which occur during the OPERATE mode of the amplifier, and the second is component variations due to, for example, large temperature changes, which occur during the RESET mode of the amplifier, but which cannot occur during the OPERATE mode because of the inherent short OPERATE time period of operational amplifiers.

Now referring to the feedback circuit, when the tank circuit is retuned due to component variations, the LC bridge is unbalanced and the DC voltage at terminal 39 varies. Transistor $T_2$ experiences a change in current conduction. This condition is undesirable because such differential change will be reflected at the output 72 when the next DC input signal is applied, thus reproducing an output signal that is not a proportional replica of the applied DC input signal. This undesirable condition is uniquely accounted for by coupling the output developed during RESET periods, back to the LC bridge circuit via switch $S_1$. Such undesirable output voltages are concurrently stored in storage capacitor 36, and applied to varicap $V_2$ via coil 32. This causes a degenerative change or retuning of the tank circuit by an amount substantially equal to the change in tuning caused by the component variations, i.e., voltage drifts during RESET periods. This degenerative feedback is dynamic in that it automatically continues during the RESET period. This feedback feature holds the drift rate of the amplifier to approximately $1/1+A$, where A equals the open-loop gain of the amplifier. When, of course, the amplifier is switched to its OPERATE mode, the capacitor 36 remembers the last voltage developed at output terminal 72 and holds the capacity of varicap $V_2$ accordingly.

With switch $S_1$ open, and the circuit accordingly in its OPERATE mode, the DC signals applied to terminal 10 cause the capacity of varicap $V_1$ to vary as the voltage across its terminals varies. Essentially, the capacity of a varicap as the reciprocal of the square-root of the voltage across its terminals. Accordingly, the DC input signals detune the tank circuit and unbalance the LC bridge network. Depending upon the polarity of the DC input signals, the DC currents through resistors 44 and 46, although opposite, will not be equal. Thus, the DC voltage applied to the base of transistor $T_2$ will be varied and accordingly increase or decrease the current conduction of this transistor, as the case may be. Basically, the detuning of the tank circuit is proportional to the DC input signals, and the DC voltage change at terminal 39 will also be proportional thereto. This will then cause a proportional change in the current conduction of transistor $T_2$. It will be apparent that the varying voltages appearing at output terminal 72 will be an amplified version of the low-level, varying DC voltages applied at terminal 10. It should be noted here, that since the OPERATE period of operational amplifiers is relatively short, the circuit function can be performed before the component changes due to large temperature gradients will have any effect upon the accuracy of its amplification function.

In the example of FIGURE 1, the output at terminal 72 will be 180° phase displaced from the DC input signals. If, of course, no phase reversal is desired, the rectifying diodes $D_1$ and $D_2$ may be reversed to that depicted in FIGURE 1. It will be apparent here that the coils 12, 30 and 38 perform the dual function of providing the inductance for the tuned tank circuit and of preventing RF energy from being coupled to ground, whereas the capacitors 14 and 28 perform the function of preventing DC from being coupled to the transformed $L_o$. Capacitors 14 and 28 represent a short circuit at RF frequencies.

Another highly advantageous feature of the present invention is the fact that the DC input impedance is determined by the leakage of capacitor 14 and the back bias leakage of varicap $V_1$, which impedance is in the order of $10^9$ ohms. In addition, the DC output impedance is determined by uonducting transistor $T_2$ and resistors 68 and 70. Accordingly, the amplifier of the present invention advantageously provides a high DC input impedance and a low DC output impedance.

It will be apparent from the foregoing that the present invention uniquely provides an operation amplifier having an extremely high DC input impedance and medium gain, thus closely approximating the function of the ideal operational amplifier. In addition, the present invention uniquely utilizes a unity gain, degenerative voltage feedback to substantially reduce voltage drifts due to large temperature variations. Further, the operational amplifier described herein provides a low DC output imepdance thus simplifying inter-circuit impedance matching aspects.

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service while still retaining certain features which may properly be said to constitute the essential items of novelty involved, which items are intended to be defined and secured by the appended claims.

I claim:

1. An operational amplifier for amplifying low-level, varying DC input voltages comprising, in combination:

(a) generating means for developing an AC frequency;

(b) resonant means coupled to said generating means and tuned by a voltage variable capacitance to said AC frequency;

(c) input means coupling said DC input voltages to said resonant means so as to vary the capacity of said voltage variable capacitance and thereby detune said resonant means in proportion to the voltage variations of said DC input voltages; and (d) DC amplifying means coupled to said resonant means for developing a DC amplified replica of said DC input voltages only when said resonant means is detuned by said DC input voltages.

2. An operational amplifier in accordance with claim 1, and further including:

(a) degenerative feedback means coupled between said resonant means and said DC amplifying means, for varying the capacity of said voltage variable capacitance and thereby retuning said resonant means in proportion to the voltage level of any voltage drifts of said amplifier which are caused by any undesirable detuning of said resonant means when no DC input voltages are applied to said input means.

3. An operational amplifier in accordance with claim 2, and further including:

(a) memory means connected in parallel to said resonant means;

(b) said memory means storing said voltage level of said voltage drifts and applying said storaged voltage level to said resonant means when DC input voltages are subsequently applied to said input means, thereby holding the capacity of said voltage variable capacitance at a desired value and compensating for said voltage drifts.

4. An operational amplifier for amplifying low-level, varying DC input voltages comprising, in combination;

(a) generating means for developing an AC frequency;

(b) resonant means coupled to said generating means and tuned by a voltage variable capacitance to said AC frequency;

(c) input means coupling said DC input voltages to said resonant means so as to vary the capacity of said voltage variable capacitance and thereby detune said resonant means in proportion to the voltage variations of said DC input voltages;

(d) rectifying means coupled to said resonant means, said rectifying means having an output circuit developing a steady DC reference voltage when said resonant means is tuned to said AC frequency and no DC input voltages are applied to said input means, and developing an amplified replica of said DC input voltages when said resonant means is detuned by said DC input voltages; and (e) degenerative feedback means coupled between the output circuit of said rectifying means and said voltage variable capacitance of said resonant means for varying the capacity of said voltage variable capacitance and thereby retuning said resonant means in proportion to any voltage variations of said reference voltage which are caused by any undesirable detuning of said resonant means when no DC input voltages are applied to said input means.

5. An operational amplifier in accordance with claim 4, and further including:

(a) memory means connected in parallel to said resonant means;

(b) said memory means storing said voltage variations of said reference voltage, and applying said stored voltages to said resonant means when DC input voltages are subsequently applied to said input means, thereby holding the capacity of said voltage variable capacitance at a desirable value and compensating for said undesirable detuning of said resonant means.

6. An operational amplifier in accordance with claim 4, and further including:

(a) amplifying means coupled in series with said feedback means for further amplifying said amplified replica of said DC input voltages before said amplified replica is applied to said resonant means.

7. An operational amplifier in accordance with claim 5, wherein:

(a) said AC frequency is an RF carrier.

8. An operational amplifier in accordance with claim 7, wherein:

(a) said resonant means is an L–C resonant circuit having a voltage variable capacitor connected in parallel to an inductor.

9. An operational amplifier in accordance with claim 8, wherein:

(a) said rectifying means is a full-wave diode rectifier having respective load resistors for the positive and negative excursions of the frequencies developed by said L–C resonant circuit.

10. An operational amplifier in accordance with claim 9, wherein:

(a) said degenerative feedback means has unity gain, and includes a series connected single-pole, single-throw switch and a second voltage variable capacitor;

(b) said second voltage variable capacitor being connected in parallel to said first voltage variable capacitor, whereby said voltage variations of said reference voltage retunes said resonant circuit by varying the capacity of said second voltage variable capacitor; and (c) said switch being closed only when said DC input voltages are not applied to said input means, thereby providing a degenerative feedback only when no DC input voltages are applied.

11. An operational amplifier in accordance with claim 10, and further including:

(a) a memory capacitance connected in parallel to said second voltage variable capacitor;

(b) said memory capacitance storing said voltage variations of said reference voltage and holding the capacity of said second voltage variable capacitor at a desired value when said switch is opened and thereby compensate for said undesirable detuning.

12. An operational amplifier for amplifying low-level, varying DC input voltages, said amplifier being in its OPERATE mode when said DC input voltages are applied and in its RESET mode in the absence of said DC input voltages, said amplifier comprising, in combination:

(a) an oscillator for developing an RF carrier frequency;

(b) an L–C resonant circuit coupled to said oscillator and having a first voltage variable capacitor connected in parallel to an inductor, said resonant circuit being tuned by said first capacitor to said RF frequency;

(c) an input circuit for coupling said DC input voltages to said resonant circuit so as to vary the capacity of said first capacitor and thereby detune said said resonant circuit in proportion to the voltage variations of said DC input voltages;

(d) a full-wave diode rectifier having respective load resistors for the positive and negative excursions of the frequencies developed by said resonant circuit and also having an output circuit, said rectifier developing a steady DC reference voltage when said resonant circuit is tuned to said RF frequency and said amplifier is in its RESET mode, and developing an amplified replica of said DC input voltages when said amplifier is in its OPERATE mode;

(e) a unity gain degenerative feedback circuit having a series connected single-pole, single-throw switch and a second voltage variable capacitor, said second capacitor being connected in parallel to said first capacitor and provides a portion of the capacity of said resonant circuit, said switch being closed so as to connect said feedback circuit to said second capacitor only when said amplifier is in its RESET mode, said feedback circuit being connected between said output circuit of said rectifier and said second voltage variable capacitor so as to vary the capacity of said second capacitor and retune said resonant circuit in proportion to any voltage variations of said reference voltage caused by undesirable detuning of said resonant circuit when said amplifier is in its RESET mode;

(f) a memory capacitor connected in parallel to said second capacitor for storing said voltage variations of said reference voltage, and for holding the capacity of said second capacitor at a desired value when said amplifier is in its OPERATE mode, thereby compensating for said undesirable detuning of said resonant circuit.

References Cited

UNITED STATES PATENTS

| | | | |
|---|---|---|---|
| 2,410,983 | 11/1946 | Kock | 329—138 |
| 2,501,077 | 3/1950 | Murakami | 329—136 X |
| 3,267,384 | 8/1966 | Scaroni | 329—136 X |

ROY LAKE, *Primary Examiner.*

NATHAN KAUFMAN, *Examiner.*